United States Patent
Williams et al.

(10) Patent No.: US 6,973,541 B1
(45) Date of Patent: *Dec. 6, 2005

(54) SYSTEM AND METHOD FOR INITIALIZING MEMORY WITHIN A DATA PROCESSING SYSTEM

(75) Inventors: James A. Williams, Mahtomedi, MN (US); Robert H. Andrighetti, Somerset, WI (US); Conrad S. Shimada, Oakdale, MN (US); Kelvin S. Vartti, Hugo, MN (US); Stephen Sutter, Osseo, MN (US); Chad M. Sonmore, Blaine, MN (US)

(73) Assignee: Unisys Corporation, Blue Bell, PA (US)

( * ) Notice: Subject to any disclaimer, the term of this patent is extended or adjusted under 35 U.S.C. 154(b) by 239 days.

This patent is subject to a terminal disclaimer.

(21) Appl. No.: 10/255,495

(22) Filed: Sep. 26, 2002

(51) Int. Cl.[7] .............................................. G06F 12/00
(52) U.S. Cl. ...................... 711/135; 711/118
(58) Field of Search ................ 711/113, 118, 130, 711/135, 154, 161, 166

(56) References Cited

U.S. PATENT DOCUMENTS

| | | | | |
|---|---|---|---|---|
| 5,845,326 A | * | 12/1998 | Hirayama et al. | 711/135 |
| 6,006,307 A | * | 12/1999 | Cherukuri | 711/114 |
| 6,088,773 A | * | 7/2000 | Kano et al. | 711/161 |
| 6,115,791 A | * | 9/2000 | Collins et al. | 711/122 |
| 6,230,241 B1 | * | 5/2001 | McKenney | 711/118 |
| 6,381,674 B2 | * | 4/2002 | DeKoning et al. | 711/113 |
| 6,546,462 B1 | * | 4/2003 | Palanca et al. | 711/135 |
| 6,601,153 B1 | * | 7/2003 | Engelbrecht et al. | 711/166 |
| 6,658,532 B1 | * | 12/2003 | Horrigan et al. | 711/135 |
| 6,681,297 B2 | * | 1/2004 | Chauvel et al. | 711/130 |
| 6,760,817 B2 | * | 7/2004 | Arimilli et al. | 711/137 |

* cited by examiner

*Primary Examiner*—Nasser Moazzami
(74) *Attorney, Agent, or Firm*—Beth L. McMahon; Charles A. Johnson; Mark T. Starr (57) ABSTRACT

An improved system and method are provided for initializing memory in a data processing system. According to one aspect of the invention, a "page zero" instruction is provided that may be executed by an Instruction Processor to initiate memory initialization. Upon instruction execution, the IP issues one or more page zero requests using a background interface of the IP. In one embodiment, each request results in the initialization of a page of memory. While page zero requests are issued over the background interface, the IP may continue issuing other read and write requests to memory over a primary interface of the IP.

44 Claims, 5 Drawing Sheets

SYSTEM AND METHOD FOR INITIALIZING MEMORY WITHIN A DATA PROCESSING SYSTEM

RELATED APPLICATIONS

The following co-pending applications of common assignee have some subject matter in common with the current application:

"Improved Cache Flush System and Method", U.S. Application Ser. No. 10/255,420, filed on Sep. 26, 2002 herewith.

FIELD OF THE INVENTION

This invention relates generally to data processing systems, and more particularly to an improved system and method for initializing memory within a large-scale data processing system.

BACKGROUND OF THE INVENTION

Modern data processing systems generally employ large amounts of Random Access Memories (RAMs). This is particularly true in systems having multiple instruction processors and input/output units. There are several memory methodologies known in the art that provide for efficient use of memory in such multiprocessing environments. One such memory methodology employs a distributed architecture wherein each processor has access to its own dedicated memory. In these systems, access to another processor's memory is often gained by sending messages via an inter-processor network. While distributed memory structures avoid problems associated with memory contention and can be implemented relatively inexpensively, these systems are usually slower than other memory methodologies, such as shared memory systems.

Shared memory architectures allow more than one processor to access a single memory. The shared memory is generally connected to the multiple processing units using a shared bus or network. Large-scale shared memories may be designed to cooperate with local cache memories that are each associated with a respective processor in the system. Cache coherency protocols ensure that one processor's copy of a shared memory location is invalidated when another processor writes to that location.

Regardless of the type memory architecture that is employed by a data processing system, it is generally desirable to provide some means to initialize the memory to a known predetermined state in an efficient manner. In most systems, memory will be initialized to a predetermined value when the system is powered on. Memory initialization may be completed as part of a power-on confidence test that verifies memory operability, for example. Additionally, it is often desirable to re-initialize portions of memory at predetermined times during system operation. For example, before memory space is allocated to an executing program, it is generally considered necessary to clear that memory space of residual data that had been stored during execution of previous processing tasks. This is often required so that confidential data is not inadvertently passed through memory to a subsequently executing process or program, resulting in a security breach. This becomes even more of a concern when multiple processors are executing from a shared memory.

The initialization of memory space can impose substantial overhead on a data processing system. This is particularly true when large numbers of buffers must be initialized and allocated on a regular basis to support executing processes. In prior art systems, this type of buffer initialization is accomplished by writing a predetermined pattern of data to memory in a conventional manner. That is, an instruction processor executing in a software loop writes "zeros" or some other predetermined pattern to a block of sequential memory addresses. This consumes the bandwidth of the instruction processor's memory interface so that the processor cannot issue other requests to the memory, negatively impacting processor throughput. Moreover, in systems that include cache memories, memory data may have to be copied from main memory into cache before that data can be modified by the processor to an initialization value. This transfer of data from main memory to a processor's cache memory during the initialization process consumes the bandwidth of the main memory interfaces.

What is needed, therefore, is an improved system and method to perform memory initialization in a data processing system.

SUMMARY OF THE INVENTION

The current invention provides an improved system and method for initializing memory in a data processing system. According to one aspect of the invention, a novel "page zero" instruction is provided to perform memory initialization. This instruction, which is part of the hardware instruction set of an Instruction Processor (IP), is executed to automatically issue requests to initialize portions of the main memory of the system. In one embodiment, execution of the page zero instruction causes hardware within an instruction processor to initiate retrieval of one or more memory addresses from a buffer pool in a main memory. The number of memory addresses that are to be retrieved, as well as the address of the buffer pool, are specified as operands of the instruction. The retrieved addresses are used by the IP to initiate requests to initialize portions of the main memory that are specified by the addresses.

According to one aspect of the invention, the retrieved addresses are loaded into a storage device within the IP. During page zero instruction execution, a circuit coupled to this storage device reads an address and provides it to Second-Level Cache (SLC) logic that is coupled to the IP. The SLC logic uses the address to invalidate any data for this address that is stored in the SLC cache memory. This address is then used to provide one or more write requests to the main memory to initialize memory associated with the address.

In one embodiment of the invention, each address that is provided to the SLC by the IP points to a page of memory, wherein a page is 32 K bytes long. Thus, for each address received from the IP during a page zero operation, the SLC invalidates all data in the addressed page, and further issues requests for the initialization of the entire page. According to another aspect of the invention, each page of memory is initialized in cache line increments, wherein a cache line includes 128 bytes. More specifically, the SLC generates address and data signals to initialize one cache line at a time. In one embodiment, each cache line request includes eight transfer operations to sequential addresses within the main memory. The SLC generates another request to initialize the next cache line after the SLC receives acknowledgement that the previous request is completed.

After all cache lines in a memory page have been initialized by the SLC logic in the manner discussed above, the SLC sends an acknowledge signal to the IP. If additional addresses remain within the IP's storage device, the IP sends the next address to the SLC and the process is repeated. When all pages of memory have been initialized, the IP notifies the operating system to indicate that the page zero operation has been completed.

According to another aspect of the invention, the IP is interconnected to the SLC via both a primary and a "background" interface. The IP makes read and write requests to the SLC cache via the primary interface. The background interface is used to make lower-priority requests such as those associated with a page zero operation. While page zero requests are provided on the background interface, other requests may be generated to the cache memory.

In another embodiment, the SLC issues special "write-through" requests to perform the memory initialization operation. Write-through requests are special operations that allow data to be written by an SLC to the main memory without first requiring that the data be retrieved from the main memory and stored within the SLC's cache. This is unlike most other SLC write operations, which may be completed only after the SLC obtains appropriate access rights as well as a copy of data from main memory. Because the use of write-through requests eliminates the time-consuming task of obtaining data and associated ownership rights, the overhead imposed by initialization operations is greatly reduced.

According to yet another aspect of the invention, execution of the page zero instruction initiates a hardware sequence within the IP to retrieve the page zero addresses from main memory, then provide the addresses to the SLC. The IP hardware that controls this functionality may be a microsequencer that operates independently from instruction decode logic and instruction pipeline. As a result, once microsequencer execution is initiated, the IP may begin executing subsequent instructions within the instruction stream. The IP is not "stalled" waiting for the initialization operation to complete. Completion of the page zero operation is signaled by the microsequencer, which generates an interrupt that is provided to the operating system. This significantly reduces overhead associated with initializing large portions of memory.

In one embodiment, an improved system for performing memory initialization is provided. This system, which is for use within a data processing system having at least one IP and a cache memory, includes a primary interface coupling the IP to the cache memory to provide read and write requests from the IP to the cache memory. The system further includes a background interface coupling the IP to the cache memory to initiate execution of lower-priority tasks associated with the cache memory.

In another embodiment, a method of initiating requests within a data processing system is provided. The method includes the steps of issuing a request to a storage device via a primary interface that couples an IP to the storage device. The method further includes issuing a background request from the IP to the storage device via a background interface that couples the IP to the storage device, the background request being lower priority than the request received over the primary interface.

According to another aspect of the invention, a method of initializing portions of a main memory is disclosed. The method includes executing a page zero instruction on an IP, utilizing a circuit within the IP to obtain at least one address for the main memory, and initiating, under control of the circuit, a write operation to initialize a portion of the main memory identified by the address.

In yet another embodiment, a system for initializing addressable locations within the main memory is provided. The system includes decode means for decoding a page zero instruction, and means responsive to the decode means for initiating the initialization of one or more addressable locations within the main memory.

Other scopes, aspects, and embodiments of the current invention will become apparent from the following description and the accompanying drawings.

DETAILED DESCRIPTION OF THE DRAWINGS

Figure 1:
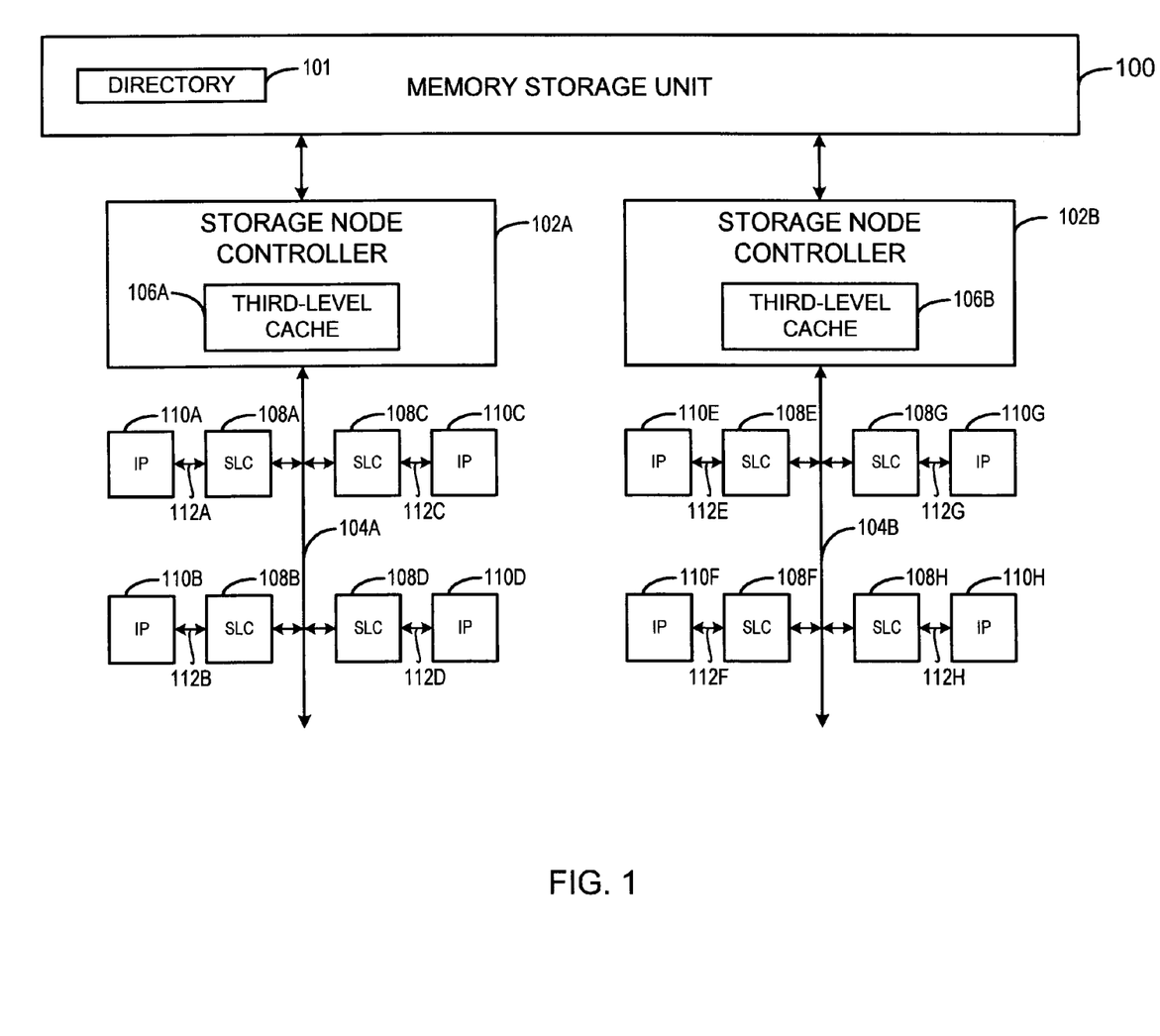
FIG. 1 is a block diagram of an exemplary data processing system of the type that may employ the current invention.

FIG. 1 is a block diagram of an exemplary data processing system as may employ the current invention. The system includes a memory storage unit (MSU) 100 that provides the main storage facility for the system. MSU 100 may include random access memory (RAM), read-only memory (ROM), and any other type of memory known in the art. MSU 100 may be subdivided into multiple subunits (not shown) in a manner largely beyond the scope of the current invention.

In one embodiment, MSU is a directory-based storage unit similar to the system described in commonly-assigned U.S. patent application Ser. No. 09/001,598 filed Dec. 31, 1997 entitled "Directory Based Cache Coherency System Supporting Multiple Instruction Processor and Input/Output Caches", incorporated herein by reference. In this embodiment, MSU retains information in directory 101 that indicates where the latest copy of requested data resides within the system. This is necessary since data from MSU 100 may be copied into any of the various cache memories within the system. Directory 101 tracks the latest copy of the data to ensure that every processor is operating from this copy. In the current embodiment, directory 101 includes a directory entry that tracks the location of each 128-byte block of memory within the MSU, where a 128-byte block is referred to as a cache line.

MSU is coupled to one or more Storage Node Controllers (SNCs) shown as SNCs 102A and 102B. The system of the current invention may include more or fewer SNCs than are shown in FIG. 1. Each SNC is coupled to MSU 100 over one or more high-speed MSU interfaces that each includes data, address, and function lines. For simplicity, each SNC is shown coupled to MSU 100 over a single interface.

Each SNC includes logic to interface to the high-speed MSU interface, and further includes logic to interface to a respective processor bus such as processor buses 104A and 104B. These processor buses can employ any type of bus protocol. Each SNC may further includes a respective cache and all supporting logic. This cache may be a Third-Level Cache (TLC), a Fourth-Level Cache (4LC), or some other type of cache memory. In the embodiment shown, these caches are TLCs 106A and 106B.

As noted above, each of SNCs 102A and 102B is coupled to a respective processor bus 104A and 104B. Each processor bus further couples to multiple local cache memories. In the current embodiment, the local cache memories are shown as Second-Level Caches (SLCs) 108A–108H. In another embodiment, these local caches may be Third-Level Caches.

Each SLC 108 is coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. The IP may be any type of processor such as a 2200™ processor commercially available from Unisys Corporation, a processor commercially available from Intel Corporation, or any other processor known in the art. Each IP may include one or more on-board caches. In the current embodiment, each IP may include a First-Level Cache (FLC). Preferably, each IP resides on a single Application Specific Integrated Circuit (ASIC) device with a respective SLC 108. Alternatively, an IP may be coupled to a respective SLC over an external interface.

During execution, an IP is accessing programmed instructions and data from the MSU 100 and its respective caches. For example, when the IPs such as IP 110A requires access to a memory address, it first attempts to retrieve this address from its internal cache(s) such as an FLC. If the requested address is not resident in the FLC, a request is sent to the respective SLC 108A. If the requested data is likewise not resident within the SLC, the SLC forwards the request to the processor bus 104A.

In one embodiment, all SLCs on a processor bus implement a snoop protocol to monitor, or "snoop", the processor bus for requests. In the current example, SLCs 108B–108D snoop the request provided by SLC 108A on processor bus 104A. If any of these SLCs stores the requested data, it will be returned to requesting SLC 108A via processor bus 104A. Additionally, SLCs 108B–108D may have to invalidate any stored copies of the data depending on the type of request made by SLC 108A. This is discussed further below.

SNC 102A also receives the request from SLC 108A. SNC 102A determines whether TLC 106A stores the most recent copy of the requested data, the data will be provided by SNC 102A to the SLC 108A.

In some instances, data requested by an IP is not resident within any of the cache memories associated with processor bus 104A. In that case, SNC 102A must forward the request to MSU 100. MSU 100 determines the location of the current copy of the requested data using information stored within its directory 101. The most current copy may reside within the MSU itself, or may reside within a cache memory that is associated with another one of the SNCs in the system, as indicated by state bits within directory 101. In the former case, the MSU provides the data directly to SNC 102A. In the latter case, the MSU must issue a "return" command to another SNC in the system to return the requested data to MSU 100, which may then provide that data to SNC 102A.

In the current example, it will be assumed that the requested data is retained by SNC 102B. Therefore, MSU issues a request to SNC 102B to prompt return of the data. Assume further that SNC 102B determines, based on stored state bits, that SLC 108E stores a valid copy of the cache line that has been modified. SNC 102B therefore issues a request on processor bus 104B for return of the modified data. SLC 108E, which is snooping bus 104B, intercepts the request and responds by returning the data to SNC 102B. In some instances, SLC 108E may retain a read-only copy of the returned data, and in other cases, SLC 108E must invalidate its copy. For example, a read-only copy may be retained if IP 110A is requesting a read-only copy. If the data is being requested for update purposes, however, SLC 108E must invalidate its copy. These details are largely beyond the scope of the current invention and are not discussed in detail. Additional information regarding a directory-based coherency scheme for use in a multiprocessor platform is discussed in the commonly-assigned U.S. patent application entitled "Directory Based Cache Coherency System Supporting Multiple Instruction Processor and Input/Output Caches" referenced above.

After SNC 102B obtains the requested data, that data is forwarded to MSU 100, which then provides that data to SNC 102A. MSU further updates directory 101 so that the location of the most up-to-date copy of the data is recorded. SNC 102A provides the data to requesting IP 110A via SLC 108A so that execution may continue.

In the system of the current embodiment, data is retrieved from, and written to, MSU 100 in cache lines, where a cache line of the current embodiment is defined as 128 contiguous bytes of memory. A cache line having any other size may be selected in the alternative. As discussed above, directory 101 records directory information on a cache-line basis. The various caches within the system also track memory on a cache-line basis.

It will be understood that the data processing system of FIG. 1 is merely exemplary. That system may include more or fewer SNCs, SLCs, and/or IPs. Additionally, many other types of system architectures may usefully employ the current invention as will be apparent from the following discussion.

Before turning to a detailed description of the invention, a discussion regarding page zeroing is provided. Page zeroing relates to filling a page of memory with all "zeros", where a page of memory is a predetermined block of memory that is typically larger than a cache line. It may be noted any other data pattern may be written to memory as an initialization value instead of zeros. In the current embodiment, a page of memory include 32 K bytes, or 256 cache lines, although any other page size may be utilized.

Page zeroing may be performed sometime after the system is initialized so that all pages within MSU 100 are initially written to zero. Thereafter, page zeroing is performed when one or more buffers are to be allocated to software applications that are executing on the system. This is done for several reasons, including maintaining security between the various software applications that are executing out of shared memory space within MSU 100.

Page zeroing is initiated when a software application makes a request to the operating system for a buffer of a requested size. The operating system responds by allocating the necessary one or more pages of memory to the software application. Before the operating system grants access to this memory, these allocated pages are initialized to a predetermined data pattern, which in the current embodiment is all "zeros".

In prior art systems, page zeroing is largely completed under software control in a manner similar to the way any other type of memory writes are accomplished. The operating system passes a memory page address to one of the IPs 110 within the system. That IP, executing under software control, writes each of the cache lines within the page to the predetermined data pattern. To do this, access to each of the cache lines in the page must be obtained. As discussed above, this could involve issuing a request for the cache line to the MSU 100, and could further entail the MSU issuing a return command so that data is returned from another cache within the system. This is extremely time consuming, and consumes bandwidth on the system interfaces.

Once a cache line resides within an IP's SLC, the writing of this cache line to the predetermined data pattern may be performed by the IP under software control. The constants are written from an IP 110 across a respective interface 112 to an SLC 108. This consumes the bandwidth of interface 112. After a cache line of memory is initialized, it is flushed back to the MSU. When all cache lines for all pages within a buffer are zeroed, the operating system grants access to the buffer to the requesting software application.

As is apparent, the page zeroing mechanism used by prior art systems may consume large portions of the bandwidth of the interfaces included within the system. This is particularly true when a sizable numbers of large buffers must be zeroed on a fairly regular basis. The current invention provides an improved mechanism for zeroing memory. The invention provides several important advantages over the prior art systems, as will become apparent from the following discussion.

Figure 2:
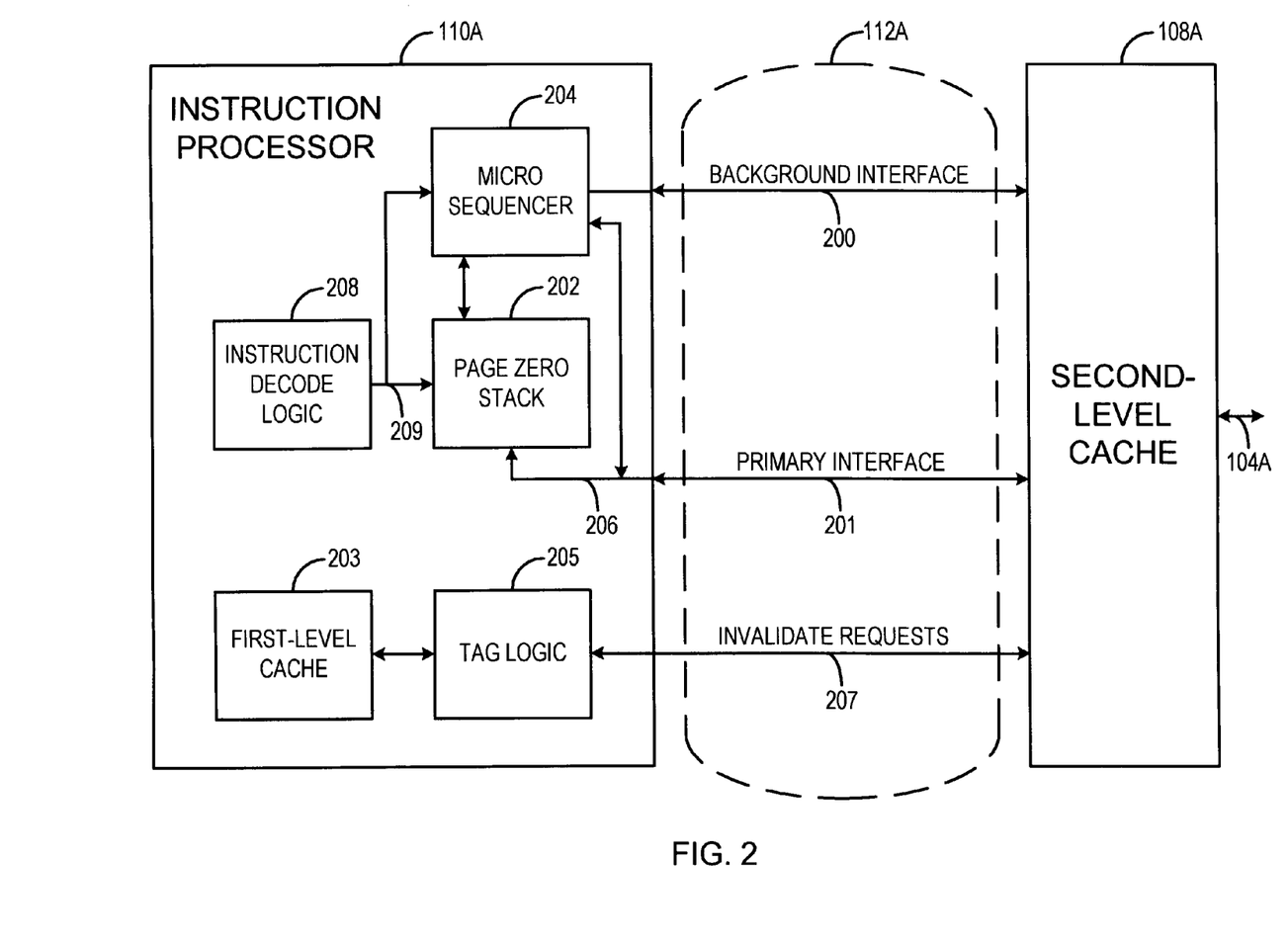
FIG. 2 is a block diagram of an Instruction Processor and Second-Level Cache according to the current invention.

FIG. 2 is a block diagram of IP 110A and SLC 108A, although it applies equally to all other IPs and SLCs in the exemplary data processing system. IP 110A is coupled via interface 112A (shown dashed) to SLC 108A. Interface 112A includes a primary interface 201, that supports data transfers between IP 110A and the SLC 108A for most data read and write operations.

IP 110A includes a First-Level Cache (FLC) 203 coupled to tag logic 205. In the current embodiment, FLC is a store-through, set associative cache that stores both instructions and operands on a cache line basis. The addresses of the cache lines stored within FLC are recorded by tag logic 205. When a cache miss occurs to FLC 203, the requested cache line is retrieved from SLC 108A, or from one of the other memories within the system via primary interface 201. Requests to invalidate a cache line stored within FLC 203 are received from SLC 108A via lines 207 of interface 112A.

According to the current invention, a second BacK-Ground (BKG) interface 200 is provided to perform page zeroing operations and other "background" tasks. BKG interface 200 may initiate page zero operations while other read and write operations are occurring concurrently on interface 201. In this manner, the completion of higher priority tasks are not delayed by the execution of a page zeroing operation.

FIG. 2 further illustrates a storage device shown as stack 202, and a microsequencer 204. Microsequencer 204 could be replaced by any other type of control circuit capable of performing control functions. Stack 202 is a storage device that, in the current embodiment, is capable of storing up to 32 page addresses. This storage device may be larger or smaller in other embodiments. This stack stores the addresses of the pages of memory that are to be zeroed during a page zero operation that is accomplished as follows.

When the operating system determines that one or more pages of memory are to be initialized to a predetermined data pattern, the operating system places the addresses of the memory pages into a buffer pool created for this purpose. Next, the operating system builds a sequence of instructions that includes a page zero instruction, which is an instruction included within the hardware instruction set of an IP. The page zero instruction includes an address A pointing to the buffer pool that stores up to thirty-two addresses. Each stored address identifies a page of memory that is to be initialized during execution of the page zero instruction. In the current embodiment, up to thirty-two page addresses may be stored within the buffer pool, with each valid page address being identified by a respective "valid bit" that is stored along with the address in the buffer pool. Execution of the page zero instruction results in initialization of the identified memory pages.

After the operating system has completed the code sequence generation, it selects one of the IPs 110 to execute this sequence. The selected IP will generally be a processor that has some available processing bandwidth, and which is not performing a time-critical task. The operating system sends an interrupt to the selected IP that includes an interrupt address specifying the starting address of the code sequence. This causes the IP to begin executing the newly generated sequence of instructions to perform one or more tasks as is deemed necessary by the operating system.

Upon executing the page zero instruction, the IP reads N page addresses from the buffer pool at address A. As discussed above, in the current embodiment, between one and thirty-two valid page addresses may be read from the buffer, with the valid page addresses each being indicated by a respective valid bit stored with the address in the buffer pool. A different maximum number of page addresses may be used in an alternative embodiment. These page addresses are read in the same manner any other data would be read from MSU 100. That is, the addresses are provided from MSU 100 to a respective SNC 102 and processor bus 104, and are thereafter forwarded to the IP via primary interface 201. The page addresses are then stored within stack 202. In one embodiment, if an address is not aligned with a page boundary, the address may be rounded down.

After one or more page addresses are stored within stack 202, instruction decode logic 208 provides control signals on lines 209 to activate microsequencer 204. Microsequencer 204 provides the control sequences to allow for completion of the page zero operation in a manner to be described below. This allows the IP to begin instruction decode for the next instruction in the instruction sequence so that IP instruction execution is not stalled waiting for initialization of the one or more pages of memory to complete. This greatly increases system throughput.

Microsequencer 204 causes the first address on stack 202 to be transferred on BKG interface 200 to SLC 108A. Logic in SLC 108A then performs the page zeroing operation in a manner to be discussed below. When the zeroing operation is complete, SLC logic 108A sends an acknowledge to microsequencer 204 via BKG interface 200. In response, microsequencer transfers the next valid address within stack 202 to SLC 108A, and so on. This process continues until all valid addresses within stack 202 have been transferred to SLC 108A. While the page zeroing operations are occurring over BKG interface 200, other tasks can be completed over primary interface 201.

As is evident from the foregoing discussion, the current system provides important benefits over the prior art systems. First, the IP may continue transferring data over primary interface 201 while the addresses associated with page zeroing operations are transferred over BKG interface 200. Thus, the page zeroing operation does not affect the bandwidth of the primary IP interface. Second, the page zeroing operation is initiated automatically by dedicated microsequencer 204, instead of being performed under software control, using, for example, a software looping construct to implement a memory block transfer operation. As such, the current invention allows the IP's instruction pipeline to continue executing software instructions associated with other tasks so that IP performance is not affected by the page zeroing operation. Additional advantages of the current invention will be apparent from the discussion that follows.

Figure 3:
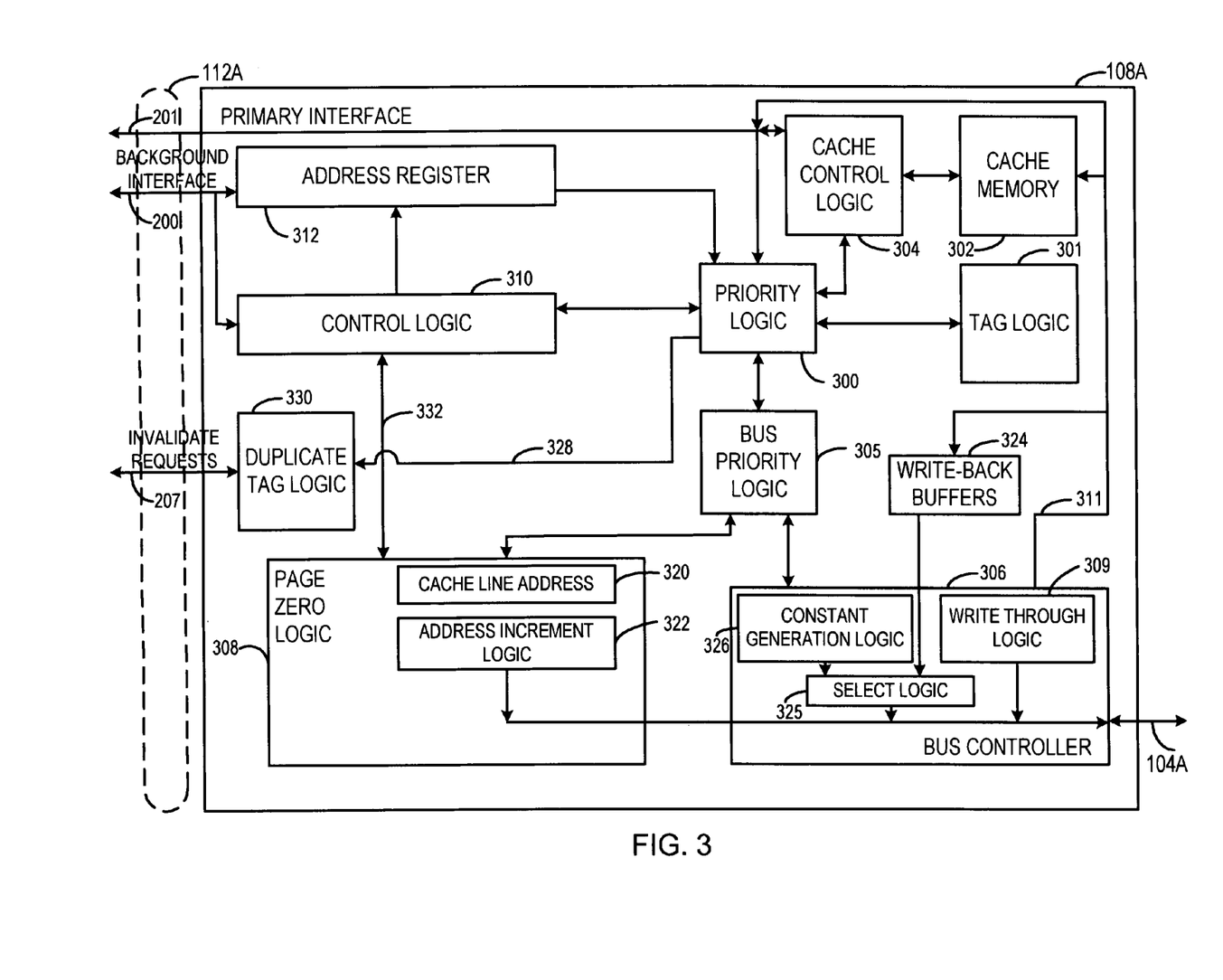
FIG. 3 is a more detailed block diagram of the Second-Level Cache of FIG. 2.

FIG. 3 is a block diagram of SLC 108A, although this illustration applies equally to each SLC 108 in the system. As discussed above, most read and write operations are performed over primary interface 201. This interface includes address, data, and function code signals that are provided to priority logic 300. Priority logic 300 queues and prioritizes these requests based on request type, as indicated by the function code signals.

Based on a predetermined priority scheme, a given request will be selected for processing by priority logic 300. At this time, the request address is provided to tag logic 301 to determine whether the cache line address for the request is resident within cache memory 302 of SLC 108A. At the same time, the request is forwarded by priority logic 300 to cache control logic 304. Cache control logic 304 performs a read and/or write operation to cache 302, as directed by the request function code signals. Data read from cache 302 is provided by cache control logic 304 to IP 110A via primary interface 201 if tag logic 301 determines that the cache line was resident within cache memory 302.

If a requested cache line is not resident in cache 302 as indicated by tag logic 301, the original request is passed to bus priority logic 305, which prioritizes all requests that are scheduled to be transferred to processor bus 104A. Eventually, the request will be transferred to bus controller 306 and driven onto processor bus 104A. SNC 102A receives the request so that it may be processed in the manner discussed above. Some time later, the requested cache line will be returned via bus 104A to bus controller 306. The data will be written back to cache memory 302 over interface 311 during a replacement operation scheduled by priority logic 300. Additionally, the data is provided to IP 110A over primary interface 201.

When data is to be written from cache memory 302 back to MSU 100, a cache line is copied from the cache memory into write-back buffers 324. When the write request is scheduled by bus priority logic 305 for presentation to processor bus 104A, select logic 325 within bus controller 306 selects write-back buffer 324 as the data source. Bus controller 306 copies the data from write-back buffers 324 and provides the data to processor bus 104A using the appropriate bus protocol.

In prior art designs, the mechanism discussed above is used for all read and write operations, including those associated with page zeroing operations. That is, before any cache line may be zeroed, the cache line must first be resident within cache 302. Then, each word in the cache line is written to zeroes using primary interface 201. In contrast, the current system does not require that a cache line be resident within cache to be initialized. Further, the current invention does not utilize interface 201 to perform page zeroing. Instead, this operation is initiated over BKG interface 200.

BKG interface 200 includes address lines, a valid indicator, a function code, and a page zero acknowledge line. To initiate a page zeroing operation, microsequencer 204 (FIG. 2) places a page address and a function code indicative of the operation on interface 200. Microsequencer 204 then asserts the valid indicator to indicate that a valid operation is occurring. This causes control logic 310 to store the page address within address register 312.

After control logic 310 receives a page-zeroing request, control logic generates a request to priority logic 300. In a manner similar to that described above, priority logic 300 prioritizes the request along with all other requests received on primary interface 201. In general, the requests received on primary interface 201 will receive higher priority than requests associated with BKG interface 200. Requests provided on the BKG interface are considered background tasks that are executed during times when the SLC workload is not at a maximum. In one embodiment, priority logic 300 may be programmable such as via a scan interface (not shown) so that the relative priority of the various requests of the system, including those received on the BKG interface, may be modified based on system needs.

Eventually, priority logic 300 will select the page address from address register 312 for presentation to tag logic 301. If the 128-byte cache line addressed by the page address is resident within cache 302 as indicated by tag logic 301, the cache line is invalidated so that processor 110A may no longer access that cache line in cache memory 302. This invalidation is accomplished by clearing the status bits stored within tag logic 301 for that cache line.

At substantially the same time that the cache line invalidation occurs, the request is passed by priority logic 300 to bus priority logic 305. Bus priority logic schedules the page zero request for presentation to bus 104A via bus controller 306. When the request gains priority, the address of the first cache line in the current page is passed to page zero logic 308, where it is stored in cache line address register 320. Page zero logic 308 controls the generation of the address signals that will be asserted on bus 104A during each page zero write request as follows.

In the current embodiment, a page zero write request includes eight sequential bus operations, each of which transfers sixteen bytes of data to initialize a total of 128 bytes of data. The address for each of the bus operations is generated by address increment logic 322, which receives the initial cache line address from cache line address register 320. After each sixteen-byte transfer operation, address increment logic 322 increments this address to point to the next sixteen-byte segment in the cache line in preparation for the next operation.

During each bus operation, bus controller generates the constant data pattern that is provided to processor bus 104A during the page zero write request. In the current embodiment, the data pattern includes all "zeros", although any other initialization value could be used in the alternative. In one embodiment, the data pattern is generated by constant generation logic 326, which is selected by select logic 325 as the data source during page zero requests. Recall that write-back buffers 324 are selected as the data source during typical write operations. According to one aspect of the invention, constant generation logic 326 may be provided with a scannable storage device to allow the constant data pattern to be programmable.

In the current embodiment, processor bus 104A includes address, data, and function signals. The function signals are driven by bus controller 306 to indicate the type of operation that is being performed. When a page zero operation is performed, write-through logic 309 drives the function signals to indicate that a "write-through" request is being issued. A write-through request is a request type that allows the SLC to write data to a cache line in the MSU 100 without first being required to obtain a copy of that cache line within cache memory 302. In other types of write operations, an SLC must always obtain a copy of the cache line along with appropriate access rights from MSU 100 before the cache line can be updated.

When SLC 108A places the write-through request on processor bus 104A, the request is snooped by every SLC 108 on processor bus 104A, including SLC 108A. In response, each SLC invalidates that cache line if it is stored within a respective cache memory. In addition, each SLC may forward the invalidation request to its respective IP 110 so that the IP can invalidate that cache line if it is stored within the FLC. For example, bus controller 306 of SLC 108A snoops its own write-through request from SNC 102A on processor bus 104A. As a result, the request is forwarded to priority logic 300 via bus priority logic 305. Priority logic prioritizes the request and eventually passes the request to tag logic 301. Because tag logic 301 of SLC 108A has already invalidated the cache line, this request does not produce any changes in the cache line state. If another SLC had issued the write-through request, however, it is possible that SLC 108A retains a valid copy of the cache line. If this is the case, the cache line state must be modified in response to this request.

Priority logic 300 further forwards the snooped request on lines 328 to duplicate tag logic 330. Duplicate tag logic 330 includes a copy of the cache line addresses that are stored within FLC 203 of IP 110A. If a search of duplicate tag logic 330 indicates that the cache line is stored within FLC 203, the cache line address is transferred on lines 207 to tag logic 205 (FIG. 2.) Tag logic 205 responds to the invalidation request by changing the cache line state to "invalid" so that further IP references to this cache line within FLC 203 must be forwarded to the SLC 108A.

When SLC 108A places the write-through request on processor bus 104A, the request is also received by SNC 102A. The request causes TLC 106A to invalidate any valid copy of the cache line. The SNC 102A then forwards the cache line address and the data including all "0s" to MSU 100. Because the operation is a write-through operation, MSU issues commands to all other SNCs in the system so that all other caches, including TLCs 106, SLCs 108, and FLCs such as FLC 203 (FIG. 2) invalidate any valid stored copies of the cache line. Thus, the write-through operation is completed without first requiring SNC 102A to obtain the cache line copy from MSU 100.

After the invalidation process is complete for the current cache line, MSU 100 returns an acknowledge to SNC 102A. SNC forwards this acknowledge to bus controller 306 of SLC 108A. Bus controller, in turn, provides the acknowledge to page zero logic 308, which forwards it to control logic 310. In response, control logic 310 causes the address stored within address register 312 to be updated to point to the start of the next cache line within the current memory page. In the current embodiment, this involves incrementing the address by "eight", although many other embodiments are possible.

After the address in address register 312 is incremented, control logic 310 generates another request to priority logic 300 so that the process may be repeated for the current cache line. This process continues until all cache lines in the current page have been zeroed. When all cache lines have been processed, control logic 310 asserts the page zero acknowledge signal on BKG interface 200. Microsequencer may then provide another page address via interface 200 if stack 202 is not yet empty so that zeroing of that additional page may be initiated.

When page zero stack 202 is empty and control logic 310 indicates that initialization for the last of the pages has been completed, IP 110A generates an interrupt to the operating system. The operating system may then grant requesting processes use of one or more of the zeroed memory pages.

The foregoing description highlights additional benefits of the current invention as compared to prior art systems. In prior art systems, cache lines must be retrieved from MSU 100 and stored in an IP's SLC before page zeroing can occur. This data retrieval may be time-consuming, and further consumes transfer cycles on system interfaces. This is particularly true if MSU 100 must issue a command to another cache in the system to cause the cache line to be returned before that cache line can be forwarded to the requester.

Unlike prior art systems, the current system does not require that a cache line is stored within an IP's SLC before zeroing can begin. Instead, a write-through operation is performed to cause zeroed data to be provided directly to MSU 100. This operation further invalidates the cache line within all caches in the system so that memory coherency is maintained. This mechanism therefore makes the zeroing operation more efficient and frees up system interfaces for other data transfers.

Figure 4A:
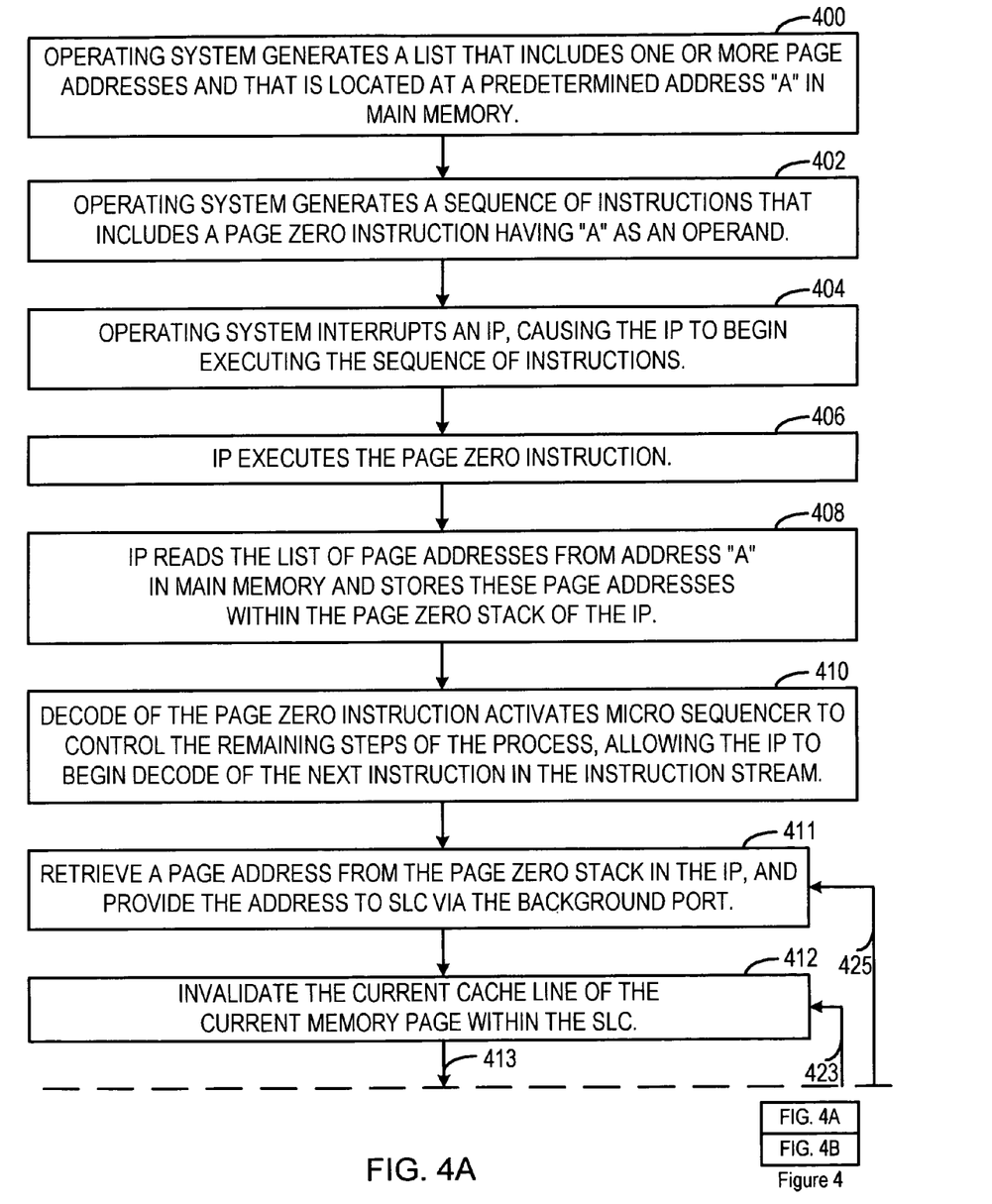
FIGS. 4A and 4B, when arranged as shown in FIG. 4, are a flow diagram of one process according to the current invention.
Figure 4B:
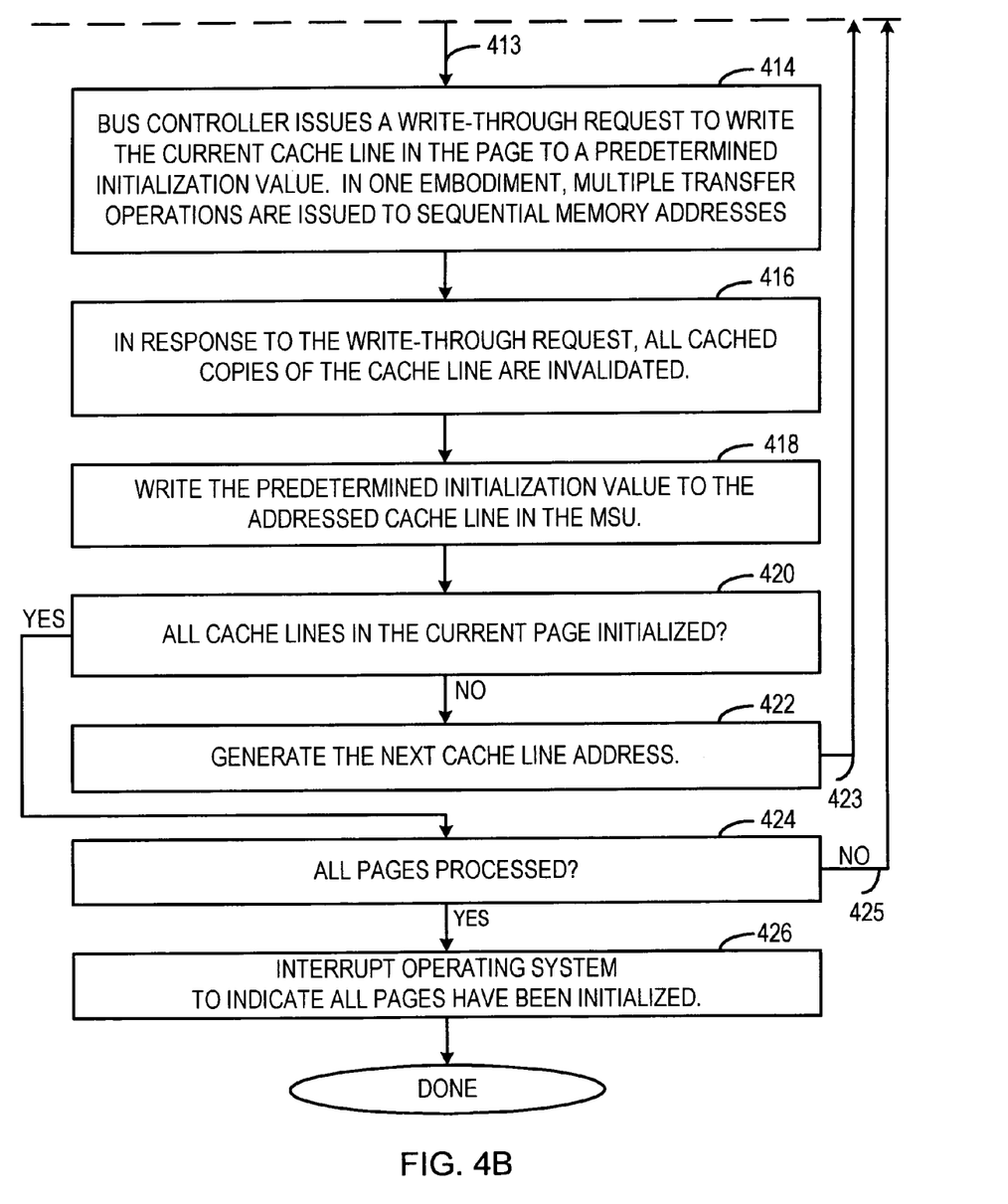

FIGS. 4A and 4B, when arranged as shown in FIG. 4, are a flow diagram of one process according to the current invention. The operating system generates a list of "N" page addresses. In the current embodiment, this list may include up to thirty-two such addresses, with each valid address being identified by a respective valid bit. This list is located at a predetermined address "A" in main memory (400). The operating system further generates a sequence of instructions that includes a page zero instruction. This instruction, which in the current embodiment is part of the machine instruction set of the IP, includes as an operand the address pointing to the list of page addresses (402). Next, the operating system interrupts a selected IP 110 to cause the IP to begin executing the newly generated sequence of instructions (404). As a result, the IP executes the page zero instruction (406).

Next, instruction decode logic 208 (FIG. 2) decodes the page zero instruction to initiate a read request via primary interface 201. The read operation retrieves a list of page addresses from address "A" in main memory, using the valid bits to determine which of the addresses are valid. These page addresses are stored within page zero stack 202 of the IP (408). Control signals from decode logic 208 then activate microsequencer 204 so that the page zero operation may be completed under microsequencer control (410). Thereafter, the IP may begin decode for the next instruction in the instruction sequence. In this manner, IP instruction execution is not stalled waiting for initialization of the one or more pages of memory to complete. Instead, the IP may continue executing additional instructions. This greatly increases system throughput.

The microsequencer retrieves one of the addresses within the page zero stack 202. This address is provided via BKG interface 200 to the associated SLC 108 (411). After SLC 108 receives this page address from the IP, SLC 108 invalidates the first (current) cache line within this current page of memory (412). Execution then proceeds to FIG. 4B, as shown by arrow 413, where bus controller 306 issues a write-through request to write the current cache line in the page to a predetermined initialization value (414). In the current embodiment, this predetermined value includes all "0s". In one embodiment, issuing this write-through request involves performing multiple transfer operations to sequential memory addresses that are generated via address incrementation.

In response to the write-through request, all caches within the system invalidate the current cache line (416). Then the predetermined initialization value is written to the cache line in MSU (418). If not all cache lines within the current page have been initialized (420), the next cache line address is generated (422). Execution then continues to step 412, as shown by arrow 423, and the initialization process is repeated for the next (current) cache line of the current page. If all cache lines have been initialized for the current page, it is determined whether initialization has been completed for all valid page addresses stored within page zero stack 202. If not, execution continues with step 410 as shown by arrow 425. The next (current) page address is retrieved from page zero stack 202, and the above-described process is completed for this memory page. After initialization for all memory pages is complete, the IP generates an interrupt to the operating system (426).

It will be appreciated that many alternative embodiments of the foregoing system and method are possible within the scope of the current invention. For example, although the current system initializes memory on page boundaries, any other increment of memory may be used. Similarly, although the SLC makes initialization requests on a cache line basis, other memory increments could be utilized. A page zero instruction may be adapted to initialize a different maximum number of pages than the thirty-two pages accommodated by the current invention. Other variations are possible within the scope of the invention. Thus, the above-described embodiments are to be considered exemplary only, with the scope of the invention is therefore indicated only by the claims that follow, rather than by the foregoing description.

What is claimed is:

1. For use in a data processing system having at least one Instruction Processor (IP), a storage device, and a cache memory, a system comprising:
   a primary interface coupling the IP to the cache memory to provide read and write requests from the IP to the cache memory; and
   a background interface coupling the IP to the cache memory to initiate initialization of a portion of the storage device.

2. The system of claim 1, wherein the storage device comprises a main memory, and wherein the background interface is coupled to a first circuit capable of initializing one or more addressable locations within the main memory to a predetermined value.

3. The system of claim 2, wherein the first circuit includes page zero logic to perform initialization of the one or more addressable locations in incremental portions.

4. The system of claim 3, wherein the main memory comprises multiple cache lines, and wherein each of the incremental portions Is one of the cache lines.

5. The system of claim 2, wherein the first circuit Includes tag logic to invalidate data that was retrieved from any of the one or more addressable locations within the main memory and stored within the cache memory.

6. The system of claim 2, wherein the first circuit includes bus controller logic to perform a write-through operation to initialize the one or more addressable locations without requiring that the contents of the one or more addressable locations be copied from the main memory to the cache memory.

7. The system of claim 2, wherein the IP includes a storage device coupled to the background interface to store at least one memory address to identify the one or more addressable locations.

8. The system of claim 7, wherein the storage device includes circuits to store multiple memory addresses, each to identify respective ones of the one or more addressable locations.

9. The system of claim 7, and further including a second circuit coupled to the storage device to provide the at least one memory address to the background interface.

10. The system of claim 9, wherein the second circuit is a microsequencer.

11. The system of claim 10, and further including instruction decode logic coupled to the second circuit to decode a page zero instruction, and to thereby activate the microsequencer.

12. The system of claim 7, wherein the first circuit includes a control circuit to initialize, for each of the at least one memory address, a respective page of the main memory.

13. The system of claim 2, wherein the predetermined value is zero.

14. A method of initiating requests within a data processing system, wherein the data processing system includes an Instruction Processor (IP) coupled to a storage device, the method comprising the steps of:
   a.) issuing a request to a storage device via a primary interface that couples the IP to the storage device; and
   b.) issuing a background request from the IP to the storage-device via a background interface that couples the IP to the storage device, the background request to cause the initialization of one or more Portions of the storage device.

15. The method of claim 14, wherein steps a.) and b.) may be performed simultaneously.

16. The method of claim 14, wherein the data processing system includes a main memory, and wherein step b.) includes issuing a page zero request to cause initialization of one or more addressable locations within the main memory.

17. The method of claim 16, where the storage device is a cache, and further including Invalidating any data copied from the one or more addressable locations to the cache.

18. The method of claim 17, and further including generating a predetermined data pattern to be used to initialize the one or more addressable locations.

19. The method of claim 18, and further including generating one or more addresses to be used to initialize the one or more addressable locations.

20. The method of claim 19, wherein the main memory includes multiple cache lines, and wherein step b.) includes initializing the one or more addresses in incremental portions, each portion comprising one of the cache lines.

21. The method of claim 20, wherein step b.) includes issuing a write-through request to allow the predetermined addresses in the main memory to be initialized without copying the contents of the predetermined addresses to the cache.

22. The method of claim 16, wherein the one or more addressable locations comprise one or more pages of the main memory.

23. The method of claim 15, and further including executing, by the IP, a page zero instruction to initiate steps a.) and b.).

24. The method of claim 23, wherein the executing step includes:
   retrieving one or more addresses from the main memory, each specifying respective addressable locations within the main memory; and
   storing the one or more addresses within a storage device of the IP.

25. The method of claim 24, wherein step a.) includes:
   a1.) retrieving one of the addresses from the storage device; and
   a2.) providing it to the background interface as the page zero request.

26. The method of claim 25, and including automatically repeating steps a1 and a2 for each of the one or more addresses stored in the storage device of the IP.

27. The method of claim 25, wherein the data processing system is operating under the control of an operating system, and further including the step of generating an interrupt to the operating system after the one or more addresses are Initialized.

28. The method of claim 27, and further including:
building, by the operating system, a list of the one or more addresses in the main memory; and
interrupting the IP to cause the IP to retrieve the one or more addresses.

29. In a data processing system having a main memory coupled to an Instruction Processor (IP), the method of initializing portions of the main memory comprising the steps of:
  a.) executing on the IP a page zero instruction that is part of the hardware instruction set of the IP;
  b.) utilizing a circuit within the IP to obtain at least one address for the main memory; and
  c.) initiating, under control of the circuit, a write operation to initialize a portion of the main memory identified by the address.

30. The method of claim 29, wherein the circuit is a microsequencer that retrieves the at least one address from a storage device within the IP.

31. The method of claim 30, wherein the IP is coupled to a cache via a background interface, and wherein step c.) includes issuing, by the microsequencer, a request to the cache over the background interface.

32. The method of claim 31, wherein the IP is further coupled to the cache via a primary interface, and further including the step of the IP issuing one or more read and write requests to the cache over the primary interface substantially simultaneously with step c.).

33. The method of claim 31, wherein step a.) includes decoding the page zero instruction to enable the microsequencer.

34. For use in a data processing system having at least one instruction processor (IP) coupled to a main memory, a system for initializing addressable locations within the main memory, comprising:
  decode means for decoding a page zero instruction that is part of the hardware instruction set of the IP; and
  means responsive to the decode means for initiating the initialization of one or more addressable locations within the main memory.

35. The system of claim 34, wherein the data processing system includes a cache, and further including background interface means for coupling the IP to the cache to provide requests to the cache for initialization of the one or more addressable locations.

36. The system of claim 35, and further including means for allowing the IP to perform read and write requests to the cache substantially simultaneously with providing requests to the cache for initialization of the one or more addressable locations.

37. The system of claim 35, and further including means for identifying the one or more addressable locations.

38. The system of claim 37, wherein the means for identifying includes operating system means for creating a list of the one or more addressable locations.

39. The system of claim 35, and further including means for copying the list of the one or more addressable locations from the main memory into the IP.

40. The system of claim 38, wherein the means responsive to the decode means is capable of operating independently of the decode means.

41. The system of claim 39, and further including bus controller means for performing write through operations, the write through operations allowing the one or more addressable locations to be initialized without copying the contents of the one or more addressable locations into the cache.

42. For use in a data processing system having a main memory coupled to multiple cache memories, wherein at least one of the multiple cache memories is coupled to an instruction processor, a system for initializing the contents of a selectable portion of the main memory to a predetermined value, comprising:
  a decode circuit to decode a page zero instruction; and
  a circuit responsively coupled to the decode circuit to cause each of the multiple cache memories to invalidate any copy of the selectable portion, and to initialize the contents of the selectable portion of the main memory to the predetermined value.

43. The system of claim 42, wherein the decode circuit is included within the instruction processor.

44. The system of claim 42, wherein the circuit includes a background interface coupling the instruction processor to a respective one of the multiple cache memories, whereby a page zero request is issued to cause invalidation of the selectable portion.

* * * * *